US012277452B2

(12) United States Patent
Garcia-Saavedra et al.

(10) Patent No.: US 12,277,452 B2
(45) Date of Patent: Apr. 15, 2025

(54) AUTONOMOUS VIRTUAL RADIO ACCESS NETWORK CONTROL

(71) Applicant: NEC Laboratories Europe GmbH, Heidelberg (DE)

(72) Inventors: Andres Garcia-Saavedra, Heidelberg (DE); Xavier Costa-Perez, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 488 days.

(21) Appl. No.: 17/762,398

(22) PCT Filed: Nov. 4, 2019

(86) PCT No.: PCT/EP2019/080122
§ 371 (c)(1),
(2) Date: Mar. 22, 2022

(87) PCT Pub. No.: WO2021/089114
PCT Pub. Date: May 14, 2021

(65) Prior Publication Data

US 2022/0342719 A1 Oct. 27, 2022

(51) Int. Cl.
*G06F 9/50* (2006.01)
*G06F 9/455* (2018.01)
*G06F 9/48* (2006.01)

(52) U.S. Cl.
CPC ........ *G06F 9/5077* (2013.01); *G06F 9/45558* (2013.01); *G06F 9/4887* (2013.01); *G06F 9/5027* (2013.01); *G06F 2009/45595* (2013.01)

(58) Field of Classification Search
CPC ............... G06F 9/5077; G06F 9/45558; G06F 2009/45595
See application file for complete search history.

(56) References Cited

U.S. PATENT DOCUMENTS 11,337,101 B2 5/2022 Roessler et al.
11,595,154 B1 * 2/2023 Hsu ...................... H04L 1/0059
(Continued)

FOREIGN PATENT DOCUMENTS

CN 109905898 A 6/2019
EP 2592863 A1 5/2013
(Continued)

OTHER PUBLICATIONS

Wu, Wenfei et al.; "PRAN: Programmable Radio Access Networks"; *HotNets-XIII: Proceedings of the 13th ACM Workshop on Hot Topics in Networks*; Oct. 27, 2014; pp. 1-7; XP055278892; ACM Publications; New York, NY, USA.
(Continued)

*Primary Examiner* — Benjamin C Wu
(74) *Attorney, Agent, or Firm* — Leydig, Voit & Mayer, Ltd.

(57) ABSTRACT

A method for managing radio and computing resources of a virtualized radio access network (vRAN) includes a number of virtualized radio access points (vRAPs) that share a common pool of central processing units (CPUs). The method includes dividing, per vRAP, an L1 layer processing pipeline into at least one main processing pipeline and into a number of subordinate processing pipelines, and coordinating the execution of the pipelines across multiple vRAPs. The coordinating includes allocating tasks of the main processing pipelines to dedicated CPUs, and allocating tasks of the subordinate processing pipelines to shared CPUs.

13 Claims, 8 Drawing Sheets

(56) References Cited

U.S. PATENT DOCUMENTS

| | | | | |
|---|---|---|---|---|
| 11,640,314 | B2 | 5/2023 | Iwasa et al. | |
| 2018/0351652 | A1* | 12/2018 | Ashrafi | H04W 28/02 |
| 2020/0296741 | A1* | 9/2020 | Ayala Romero | H04W 72/535 |
| 2021/0119848 | A1* | 4/2021 | Ibars Casas | H04L 1/0052 |
| 2021/0334101 | A1* | 10/2021 | Palermo | G06F 9/30189 |
| 2022/0232423 | A1* | 7/2022 | Thyagaturu | H04W 28/10 |
| 2022/0342719 | A1* | 10/2022 | Garcia-Saavedra | G06F 9/5027 |
| 2024/0004704 | A1* | 1/2024 | Garcia-Saavedra | G06F 9/4887 |
| 2024/0014831 | A1* | 1/2024 | Parker | H04B 1/0003 |

FOREIGN PATENT DOCUMENTS

| | | | |
|---|---|---|---|
| JP | 2019/144717 | A | 8/2019 |
| JP | 2019/525650 | A | 9/2019 |

OTHER PUBLICATIONS

Gémieux, Michel et al.; "Towards LTE physical layer virtualization on a COTS multicore platform with efficient scheduling"; *2016 14th IEEE International New Circuits and Systems Conference* (*NEWCAS*); Jun. 26, 2016; Abstract; XP032983413; IEEE; Piscataway, NJ, USA.

O-RAN Alliance; "Cloud Architecture and Deployment Scenarios for O-RAN Virtualized RAN"; *O-RAN Specifications—O-RAN WG6 Technical Report*; Oct. 31, 2019; pp. 1-48; vol. 1; XP93089241; [Online] Retrieved from Internet: https://orandownloadsweb.azurewebsites.net/specifications; O-RAN Alliance e.V.; Alfter, Germany.

* cited by examiner

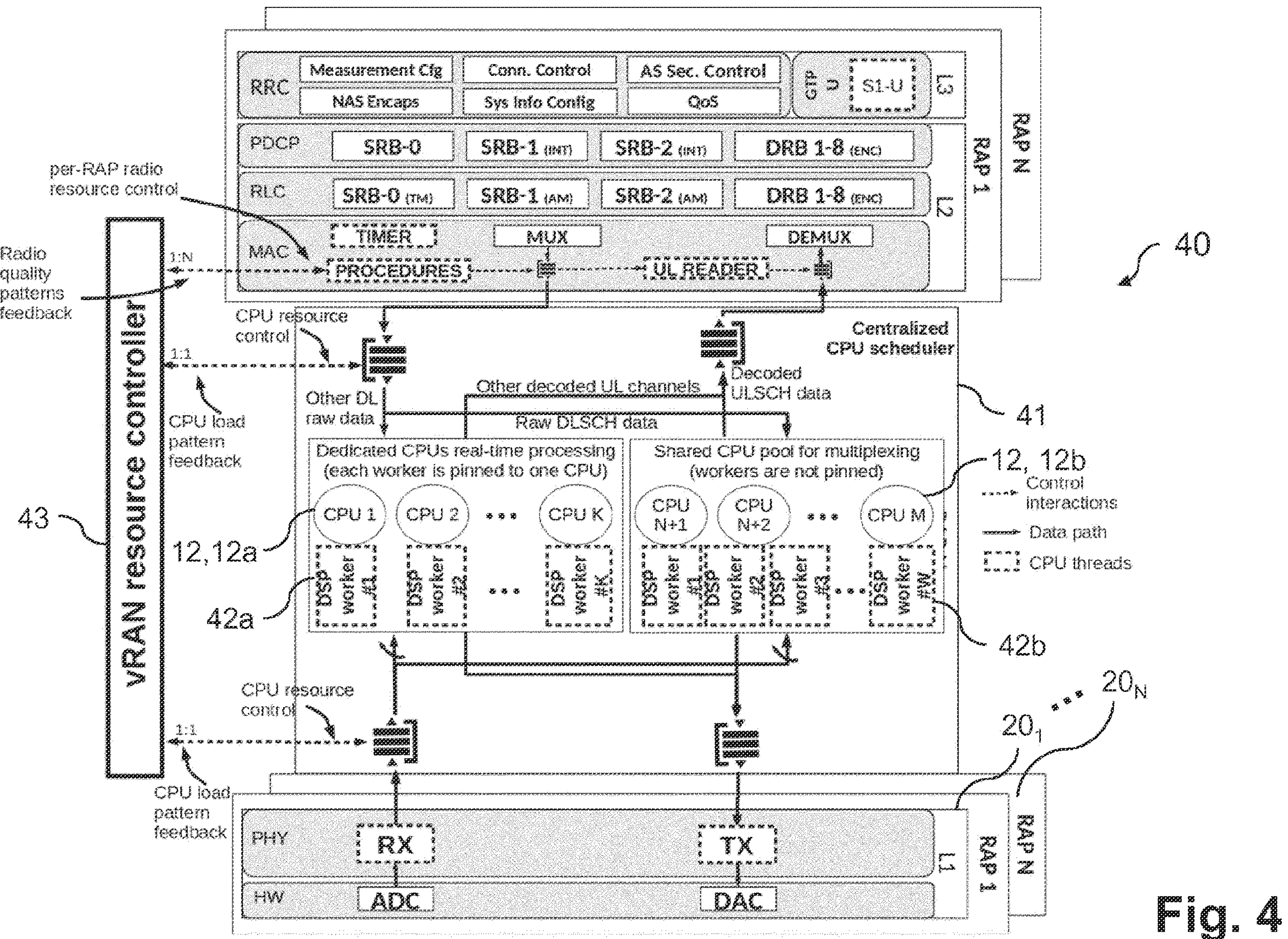
RAP N
RAP 1
RRC
Measurement Cfg
Conn. Control
AS Sec. Control
NAS Encaps
Sys Info Config
QoS
GTP U
S1-U
L3
PDCP
SRB-0
SRB-1 (INT)
SRB-2 (INT)
DRB 1-8 (ENC)
RLC
SRB-0 (TM)
SRB-1 (AM)
SRB-2 (AM)
DRB 1-8 (ENC)
L2
MAC
TIMER
MUX
DEMUX
PROCEDURES
UL READER
per-RAP radio resource control
Radio quality patterns feedback
1:N
40
CPU resource control
1:1
Centralized CPU scheduler
Other DL raw data
Other decoded UL channels
Decoded ULSCH data
Raw DLSCH data
41
CPU load pattern feedback
Dedicated CPUs real-time processing (each worker is pinned to one CPU)
Shared CPU pool for multiplexing (workers are not pinned)
12, 12b
CPU 1
CPU 2
CPU K
CPU N+1
CPU N+2
CPU M
Control interactions
Data path
CPU threads
43
12,12a
DSP worker #1
DSP worker #2
DSP worker #K
DSP worker #1
DSP worker #2
DSP worker #3
DSP worker #W
42a
42b
vRAN resource controller
CPU resource control
1:1
$20_N$
$20_1$
CPU load pattern feedback
PHY
RX
TX
L1
HW
ADC
DAC
Fig. 4

AUTONOMOUS VIRTUAL RADIO ACCESS NETWORK CONTROL

CROSS REFERENCE TO RELATED APPLICATIONS

This application is a U.S. National Phase application under 35 U.S.C. § 371 of International Application No. PCT/EP2019/080122, filed on Nov. 4, 2019. The International Application was published in English on May 14, 2021 as WO 2021/089114 A1 under PCT Article 21(2).

FIELD

The present invention relates to a method for managing radio and computing resources of a virtualized radio access network (vRAN), wherein the vRAN comprises a number of virtualized radio access points (vRAPs) sharing a common pool of central processing units (CPUs). The present invention also relates to a vRAN system with radio and computing resources management functionality. The vRAN system includes a number of vRAPs sharing a common pool of CPUs.

BACKGROUND

Radio Access Network virtualization (vRAN) is well-recognized as an important technology to accommodate the ever-increasing demand for mobile services at an affordable cost for mobile operators. FIG. 1 illustrates a typical vRAN system 10 with a set of vRAPs 11 sharing a common pool of Central Processing Units 12 (CPUs) to perform radio processing tasks such as signal modulation and encoding, as indicated by the solid line arrows. As can be obtained from FIG. 1, vRAN centralizes softwarized radio access point (RAP) stacks 13 into a computing infrastructure 14, sometimes referred to as BBU (base band unit) pool, in a cloud location, typically at the edge, where CPU resources are expensive. This provides several advantages, such as resource pooling (via centralization), simpler update roll-ups (via softwarization) and cheaper management and control (via commoditization). Estimates include 10-15% and 22% reduced capital expenditure per square kilometer and CPU demand, respectively.

Considering these advantages, vRAN has attracted substantial attention in academia and industry. OpenRAN, O-RAN Alliance or Rakuten's Open vRAN—led by operators (such as AT&T, Verizon or China Mobile), manufacturers (such as Intel, Cisco or NEC) and research leaders (such as Stanford University)—are only examples of publicly disseminated initiatives towards fully programmable, virtualized and open RAN solutions based on general-purpose processing platforms (GPPP) in combination with decoupled BBUs and remote radio units (RRUs).

Despite the above, the gains attainable today by vRAN are far from optimal, which hinders its deployment at scale. Computing resources are inefficiently pooled since most implementations over-dimension computational capacity to cope with peak demands in real-time workloads. Conversely, substantial cost savings can be expected by dynamically adapting the allocation of resources to the temporal variations of the demand across vRAPs. There is nonetheless limited hands-on understanding on the computational behavior of vRAPs and the relationship between radio and computing resource dynamics. Such an understanding is required to design a practical vRAN resource management system.

S. Ben Alla, H. Ben Alla, A. Touhafi and A. Ezzati: "An Efficient Energy-Aware Tasks Scheduling with Deadline-Constrained in Cloud Computing", in *Computers* 2019, 8(2):46 discloses an energy-aware task scheduler implemented on a cloud broker with deadline constraints in cloud computing. The tasks are divided, ranked and prioritized on the basis of deadline and waiting time (high, medium, low priorities). For each type of ranked tasks, a VM is already present that takes that task and executes it.

V. Quintuna Rodriguez and F. Guillemin: "Higher aggregation of gNodeBs in Cloud-RAN architectures via parallel computing", in *22nd Conference on Innovation in Clouds, Internet and Networks and Workshops* (*ICIN*), 2019 Feb. 19, pp. 151-158 discloses a method for virtualizing and centralizing real-time network functions in a cloud RAN (C-RAN) framework. The document discloses a dynamic multi-threading approach to achieve parallel computing on a multi-core platform in which bi-directional intra-PHY functional split (namely, FS-VI) is used for transmitting encoded and decoded data over Ethernet. The system keeps the real-time functions, e.g., channel coding in the network and other functions in a distributed unit.

SUMMARY

In an embodiment, the present disclosure provides a method for managing radio and computing resources of a virtualized radio access network (vRAN). The vRAN includes a number of virtualized radio access points (vRAPs) that share a common pool of central processing units (CPUs). The method includes dividing, per vRAP, an L1 layer processing pipeline into at least one main processing pipeline and into a number of subordinate processing pipelines, and coordinating the execution of the pipelines across multiple vRAPs. The coordinating includes allocating tasks of the main processing pipelines to dedicated CPUs, and allocating tasks of the subordinate processing pipelines to shared CPUs.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 4 is a schematic overview of a centralized vRAN system according to an embodiment of the invention;

DETAILED DESCRIPTION

Figure 1:
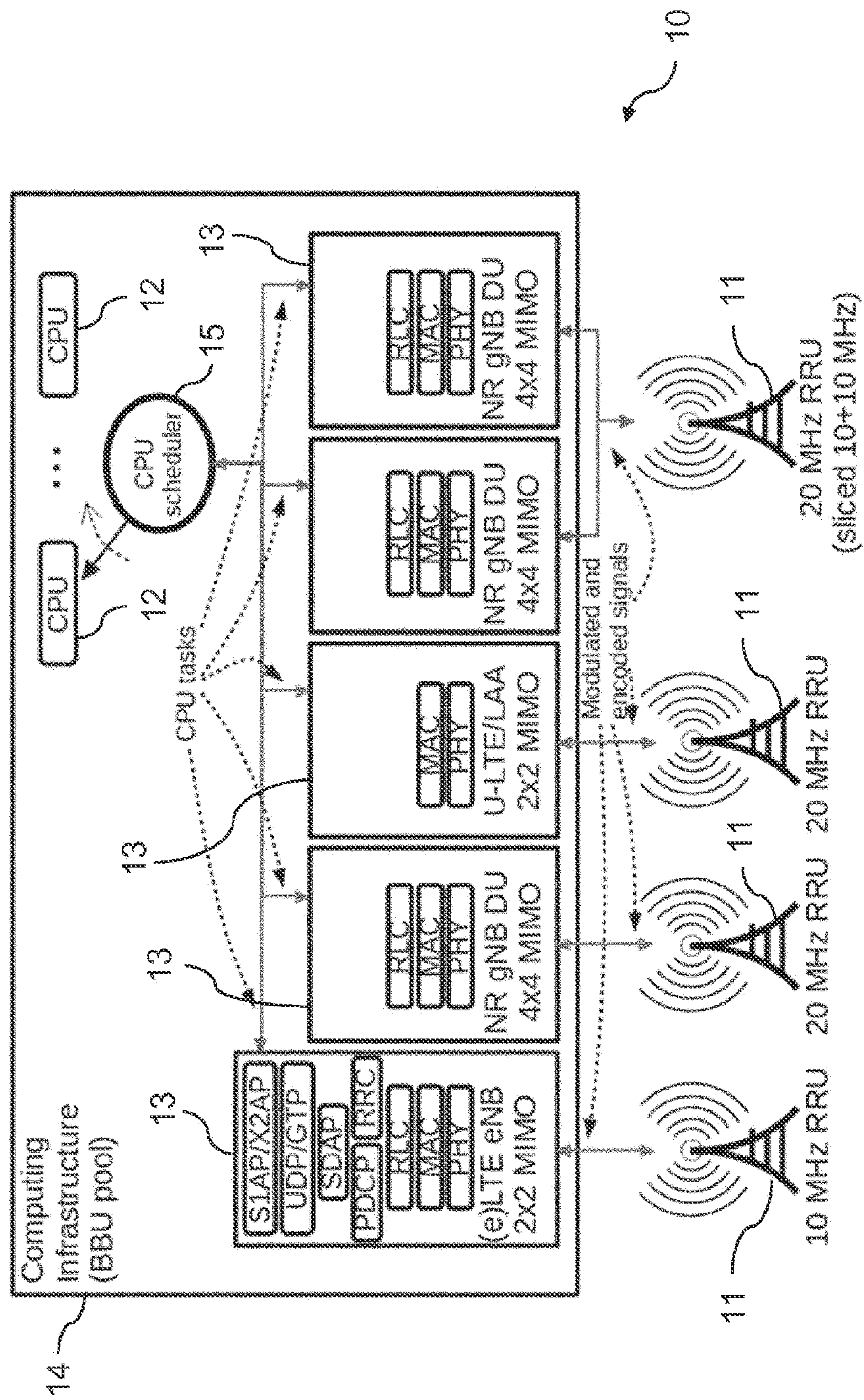
FIG. 1 is a schematic view of a virtualized Radio Access Network (vRAN) system.

Embodiments of the present invention provide a method for managing radio and computing resources of a virtualized radio access network (vRAN) and a vRAN system with radio and computing resources management functionality of the initially described type in such a way that efficiency and practicability of vRAN resource management is enhanced.

According to some embodiments, in a method for managing radio and computing resources of a vRAN, the vRAN comprises a number of virtualized radio access points (vRAPs) sharing a common pool of central processing units (CPUs). The method includes dividing, per vRAP, an L1 layer processing pipeline into at least one main processing pipeline and into a number of subordinate processing pipelines, and coordinating the execution of the pipelines across multiple vRAPs. This coordinating includes allocating tasks of the main processing pipelines to dedicated CPUs, and allocating tasks of the subordinate processing pipelines to shared CPUs.

According to some embodiments, a vRAN system with radio and computing resources management functionality includes a number of vRAPs sharing a common pool of CPUs, an L1 layer processing pipeline that is divided, per vRAP, into at least one main processing pipeline and into a number of subordinate processing pipelines, and a centralized CPU scheduler for L1 workload across multiple vRAPs, the centralized CPU scheduler being configured to allocate tasks of the main processing pipelines to dedicated CPUs, and allocate tasks of the subordinate processing pipelines to shared CPUs.

According to embodiments of the invention, it has been recognized that the efficiency and practicability of vRAN resource management can be enhanced based on a pipeline concept that divides the L1 layer processing pipeline into at least one main processing pipelines and into a number of subordinate processing pipelines. Layer 1 (L1) or Physical layer (PHY) is the first processing layer in a wireless communication stack, and is in charge of basic baseband signal processing, such as encoding/decoding, modulation/demodulation, etc. According to the pipeline concept of the present invention the at least one main processing pipeline and the number of subordinate processing pipelines may run in parallel. A centralized CPU scheduler can then coordinate the execution of the pipelines across multiple vRAPs in a very efficient way by allocating tasks of the main processing pipelines to dedicated CPUs, and by allocating tasks of the subordinate processing pipelines to shared CPUs.

For instance, according to embodiments the execution of L1 pipelines across multiple vRAPs may be coordinated based on a decoupled pipeline per virtual RAP L1 layer that divides L1 tasks into one (or more) main pipeline(s) and two (or more) parallel subordinate pipelines. The main pipeline(s) from one or more vRAPs may be real time pipeline(s) and are in charge of control channel-related operations (e.g., encoding/decoding control channels) and other basic baseband operations (such as demodulation and modulation). For instance, in case of 4G and 5G cellular communication systems, one of the parallel pipelines may be in charge of decoding user data from PUSCH channels and then buffer the decoded data into a buffer, such that data is ready for processing in the upper layers of the vRAP stack. Another of the parallel subordinate pipelines may be in charge of encoding user data into PDSCH channels, which are buffered when ready awaiting to be placed into a subframe by the main pipeline. In this regard the invention increases cost-efficiency of (edge) cloud radio access network deployments (e.g. in O-RAN systems) by enabling multiplexing of best-effort L1 tasks and by coordinating the allocation of resources across all vRAPs in the vRAN system in a centralized manner.

According to embodiments the system may comprise a centralized scheduler that is configured to assign tasks either to dedicated CPUs or to shared CPUs, depending on whether the respective task is a task of a (real-time) main pipeline or of a (best-effort) subordinate pipeline. Specifically, the centralized CPU scheduler may be configured to assign L1 work pipelines into respective Digital Signal Processing (DSP) worker threads that are associated to an appropriate type of CPU pool (best-effort pools or real-time pools) depending on the type of the pipeline and, optionally, on the vRAP QoS requirements and/or price. In an embodiment, the centralized CPU scheduler coordinates all threads/pipelines across multiple virtual RAPs in the system to respect deadline constraints of real-time pipelines. To this end, the centralized CPU scheduler may exploit statistical multiplexing in non-real-time pipelines.

For instance, according to embodiments it may be provided that all the L1 processing pipeline (not only encoding and decoding functions, like in prior art solutions) is decoupled into at least three pipelines. This allows best effort processing of encoding and decoding pipelines (which could be further parallelized) and adding buffers to smooth possible burstiness of processing deadlines of the task processors resulting from sharing CPUs. The (best-effort) operation of PUSCH/PDSCH encoding/decoding processing tasks, which, by implementing the present invention, are freed from delay deadline constraints, may be synchronized with a real-time pipeline (mostly processing control-plane signals) to ensure smooth operation and allow for multiplexing gains.

In some embodiments, the centralized scheduler is further configured to jointly schedule i) L1 work pipelines into CPUs, as already described above, and ii) data into radio resources in real time. In this context it may be provided that policies in the centralized CPU scheduler coordinating the execution of L1 workload and each radio scheduler across multiple vRAPs are jointly optimized.

According to embodiments, the vRAN system comprises a vRAN resource controller that is configured to compute radio and computing scheduling policies to be followed by the RAPs' radio schedulers and the centralized CPU scheduler. For computing the scheduling policies, the vRAN resource controller may use, e.g., machine learning, reinforcement learning and/or other optimization methods. The vRAN resource controller may be implemented as a centralized controller that manages the RAP's radio and CPU scheduling policies jointly.

Throughout the figures, like reference numerals denote like components with the same or at least a similar functionality.

Generally, dynamic resource allocation in vRAN is an inherently hard problem and a sophisticated understanding on the computational behavior of vRAPs and the relationship between radio and computing resource dynamics is required.

Figure 2:
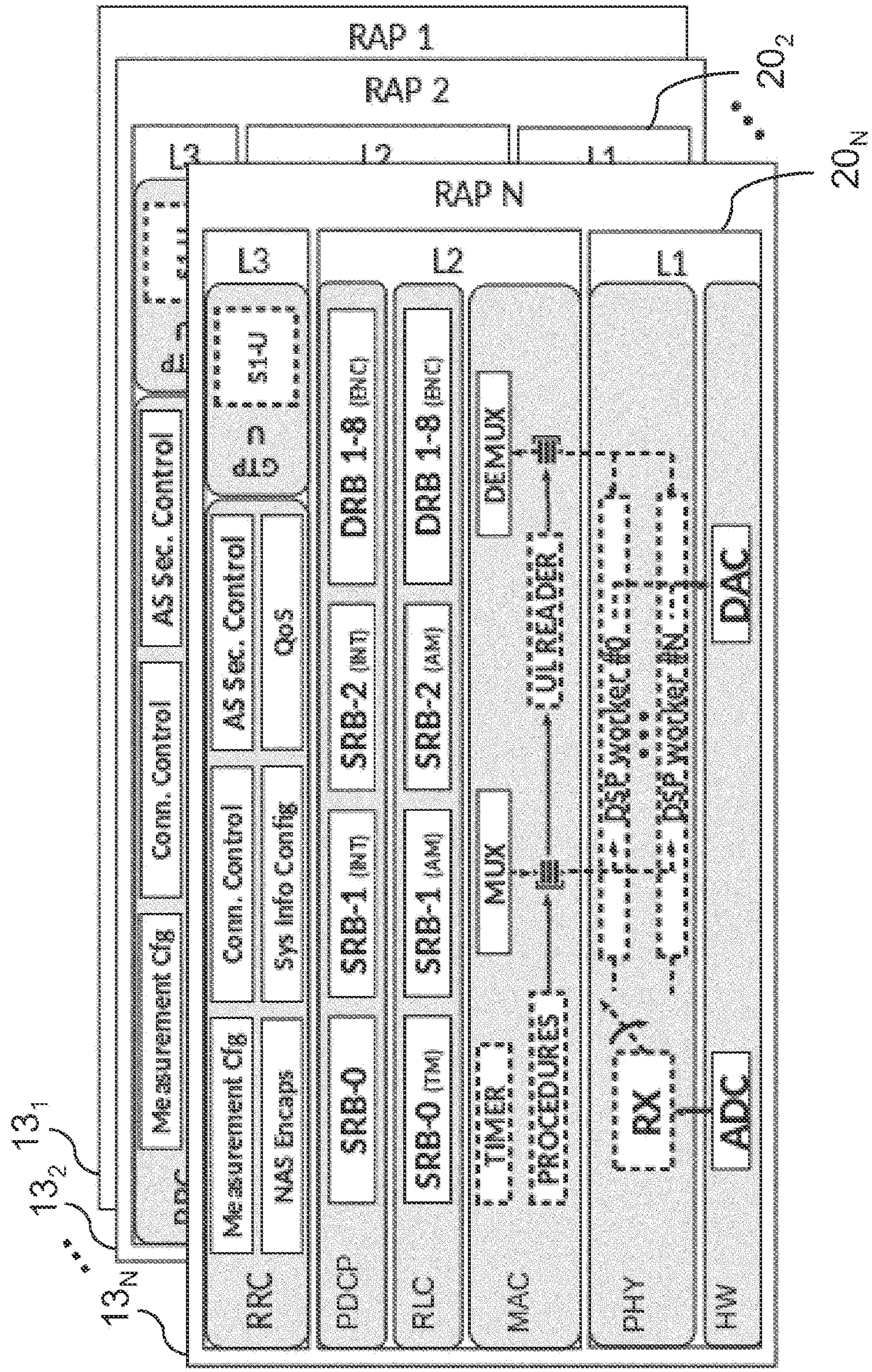
FIG. 2 is a schematic overview of a virtualized LTE stack in a vRAN system according to some embodiments.

FIG. 2 illustrates a set of vRAP stacks 13. FIG. 2 focuses on 4G LTE, however, as will be ap–preciated by those skilled in the art, a very similar architecture can be found for 5G NR (New Radio). The main issues in a vRAN system 10, like the one shown in FIG. 1, when multiple stacks $\mathbf{13}_1, \ldots, \mathbf{13}_N$ like those in FIG. 2 share computational resources are the following:

(i) The L1 layer 20, as shown in FIG. 2, is the most CPU-intensive layer of the stack 13. To process the L1 layer's 20 workload, Digital Signal Processing (DSP) worker threads are issued to perform a pipeline like, e.g., the L1 pipeline 30 illustrated in FIG. 3. The usual approach to implement the L1 layer 20 is to assign the pipeline to available DSP workers on each subframe (every millisecond) and these workers are coordinated internally by each RAP. Given the time-sensitive nature of this pipeline, these DSP worker threads are usually real-time and have the highest priority when facing the CPU scheduler 15 of the vRAN system 10 (see FIG. 1). However, when multiple vRAPs in a vRAN issue real-time DSP worker threads without outside coordination, they may end up sharing common CPUs 12 with equal priority and hence violate delay deadlines. In this context it should be noted that, though multiple pipelines may be executed in parallel through multiple DSP workers, the signals for a downlink (DL) subframe must be ready every millisecond and a DSP worker must be free to process uplink (UL) subframes every millisecond. These deadlines can be easily violated when they share CPUs 12.

Figure 3:
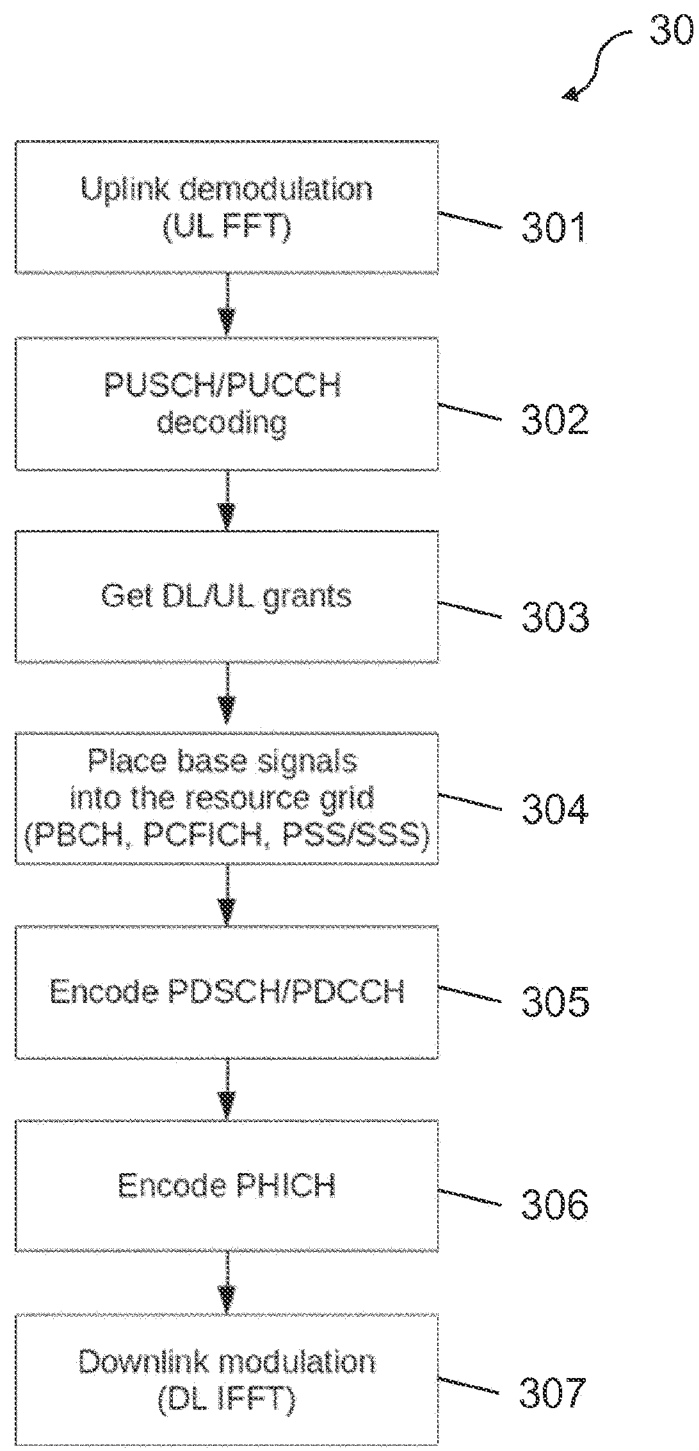
FIG. 3 is a schematic overview of a processing pipeline for processing the workload of the L1 layer of the stack shown in FIG. 2 according to some embodiments.

(ii) Common vRAP implementations use real-time threads to execute a pipeline 30 as shown in FIG. 3 despite the fact that some tasks in the pipeline 30 could be decoupled into real-time tasks (e.g., in LTE, PSS/SSS (Primary/Secondary Synchronization Signal) signal processing) and best-effort tasks (e.g., in LTE, PUSCH (Physical Uplink Shared Channel) decoding). Moreover, certain tasks such as "Encode PDSCH", as part of the "Encode PDSCH/PDCCH" task 305 (PDSCH/PDCCH=Physical Downlink Shared/Control Channel), and "PUSCH decoding", as part of the "PUSCH/PUCCH decoding" task 301 (PUSCH/PUCCH=Physical Uplink Shared/Control Channel), require substantial amount of CPU time compared to the other tasks and induce head-of-line blocking, i.e., the whole pipeline 30 is stalled until such CPU-intensive tasks finish. In scenarios with constrained CPU resources, this approach may violate delay deadlines too.

(iii) The computational behavior of vRAPs 11 depends on many factors, including the radio channel or user demand, which cannot be easily controlled. More specifically, there is a strong dependency of the computational behavior of vRAPs 11 with the context (such as data bit-rate load and signal-to-noise-ratio (SNR) patterns), the RAP configuration (e.g., bandwidth, MIMO setting, etc.) and on the infrastructure pooling computing resources.

(iv) Finally, upon compute capacity shortage, computing control decisions and radio control decisions (e.g., scheduling and modulation and coding selection) are coupled; certainly, it is well known that scheduling users with higher modulations and coding schema (MCS) incur in higher instantaneous computational load.

FIG. 4 illustrates a vRAN system 40 that addresses the aforementioned challenges in accordance with embodiments of the present invention. The system 40 comprises a number 1, . . . , N of vRAPs and a number of CPUs 12 together with a centralized CPU scheduler 41. The centralized CPU scheduler 41 operates under a CPU policy and is configured to schedule the L1 layer workloads $\mathbf{20}_1, \ldots, \mathbf{20}_N$ across multiple vRAPs. As will be described in greater detail below, by setting an appropriate policy, the scheduler 41 can efficiently assign workloads to available CPUs 12 in a coordinated fashion. In particular, the scheduler 41 can balance real-time workloads and best-effort workloads across different vRAPs without compromising delay deadlines of real-time threads.

Figure 5:
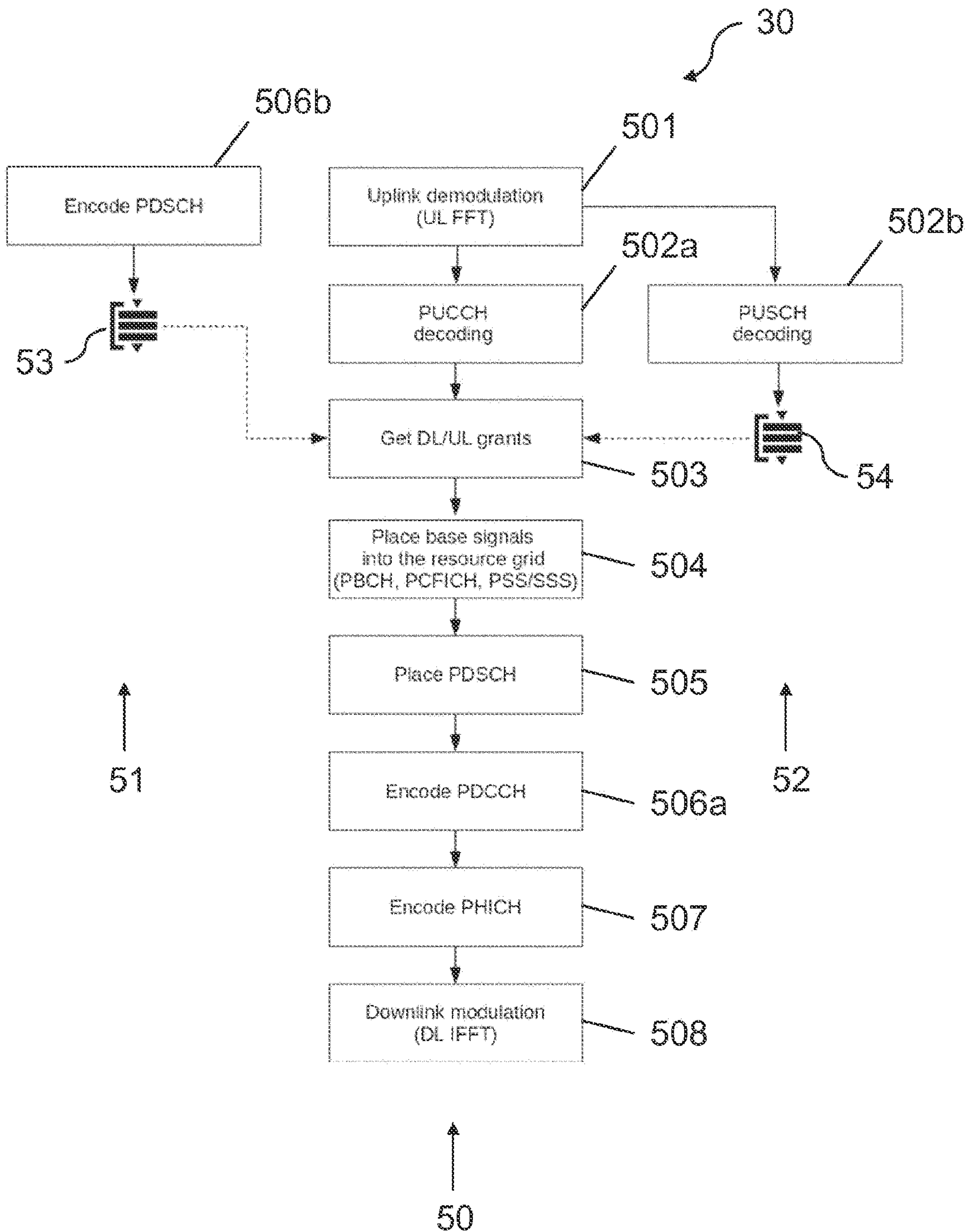
FIG. 5 is a schematic overview of a L1 processing pipeline decoupled into main and subordinate processing pipelines in accordance with an embodiment of the invention.

According to an embodiment, the most CPU-intensive tasks of the L1 layer workloads $\mathbf{20}_1, \ldots, \mathbf{20}_N$ are decoupled from the L1 pipeline. As already mentioned above, a typical L1 pipeline 30 is shown in FIG. 3 and includes the following tasks: "Uplink demodulation (UL FFT)" 301, "PUSCH/PUCCH decoding" 302, "Get DL/UL grants" 303, "Place base signals into the resource grid (PBCH, PCFICH, PSS/SSS)" 304, "Encode PDSCH/PDCCH" 305, "Encode PHICH" 306, and "Downlink modulation (DL IFFT)" 307. Among the listed tasks, PUSCH decoding and PDSCH encoding can be clearly identified as those tasks that require the by far most CPU resources. Consequently, these two tasks are decoupled from the L1 pipeline 30, as shown in FIG. 5.

The result of the decoupling is a split of the L1 pipeline 30 into one main processing pipeline 50 and two subordinate processing pipelines 51, 52. The main processing pipeline 50 includes all tasks from "Uplink demodulation" 501 to "Downlink modulation" 508, except for the task "Encode PDSCH" 506*b* (contained in subordinate processing pipeline 51) and "PUSCH decoding" 502*b* (contained in subordinate processing pipeline 52).

According to an embodiment of the invention, the execution of pipelines across multiple vRAPs is coordinated in such a way that tasks of the (one or more) main processing pipelines 50 are allocated to dedicated CPUs 12*a* to be processed as real-time or quasi real-time tasks, while tasks of the (one or more) subordinate processing pipelines 51, 52 are allocated to shared CPUs 12*b* to be processed as best-effort tasks as can be obtained from FIG. 4.

Specifically, according to embodiments, the centralized CPU scheduler 41 comprises two CPU pools, as also shown in FIG. 4: a first pool containing the dedicated CPUs 12*a* (i.e. CPU 1, . . . , CPU K) reserved for the real-time or quasi-real-time main pipeline(s) 50, and a second pool containing the shared CPUs 12*b* (i.e. CPU N+1, . . . , CPU M) reserved for the best-effort subordinate pipelines 51, 52. According to an embodiment, the first pool of dedicated CPUs 12*a* may be used in such a way that each real-time DSP worker 42*a* is pinned to a single and different CPU 12*a*. In this way, each worker 42*a* does not have to share CPU resources to guarantee real-time delay deadlines. The CPU scheduler 41 then simply has to choose an idle real-time CPU 12*a* out from the first pool that can then be allocated to a dedicated DSP worker 42*a* to be processed exclusively by the respective CPU 12*a*. On the other hand, the second pool of shared CPUs 12*b* may be used in such a way that two or more best-effort DSP workers 42*b* can share CPUs here, i.e. the two or more best-effort DSP workers are 42*b* processed jointly by the respective shared CPU 12*b*.

With respect to the L1 processing pipeline 50 of FIG. 5 it may be provided that the main pipeline 51 (from "Uplink demodulation" 501 to "Downlink modulation" 508) runs on real-time threads allocated to the dedicated CPUs 12*a*, whereas the task "Encode PDSCH" 506*b* of subordinate pipeline 51 and the task "PUSCH decoding" 506*a* of subordinate pipeline 52 run in best-effort threads at shared CPUs 12*b*. This alleviates the head-of-line blocking problem mentioned above and enables CPU resource multiplexing. As a result, the outcome of "Encode PDSCH" 506*b* and "PUSCH decoding" 506*a* tasks is provided in a best effort manner and its service rate may be bursty.

Embodiments of the invention provide for the buffering of the data resulting from the two tasks "PUSCH decoding" 506*a* and "Encode PDSCH" 506*b* in respective buffers 53, 54. In this way, the main pipeline 50 only needs to grab data from these buffers 53, 54 when available, and place the PDSCH and/or send PUSCH data upwards in the protocol stack. The buffers 53, 54 are particularly useful for accommodating data in case of bursty service rates.

According to a further embodiment, the two tasks "PUSCH decoding" 506*a* and "Encode PDSCH" 506*b* may also provide feedback to the main pipeline 50 (dotted lines in the figure), e.g., to compute DL/UL grants in task 503, as indicated by the dotted lines in FIG. 5.

As can be obtained from FIG. 4, according to some embodiments the vRAN system 40 further comprises a vRAN resource controller 43. In the embodiment of FIG. 4 the vRAN resource controller 43 is implemented as an external centralized entity. Generally, the vRAN resource controller 43 may be configured to provide a radio scheduling policy that is enforced by the vRAPs. For instance, the radio scheduling policy may include policies on modulation and coding scheme selection, physical radio block allocation policies, etc. This is particularly useful for scenarios of network slicing or vRAP-as-a-service where tenants pay for what they use.

The vRAN resource controller 43 may also be in charge of providing a sharing policy that determines the amount of resource sharing of the shared CPUs 12*b* among the tasks of the best-effort pipelines 51, 52. The sharing policy may be configured depending on the needs of the vRAPs. Generally, more sharing implies longer times for decoding/encoding data. This is particularly suitable for network slicing, as tenants can be offered lower or higher prices depending on the delay tolerance of the vRAP (or slice) of the tenant. This can be useful to distinguish delay-sensitive traffic and other more elastic traffic (UDP vs. TCP for instance).

Advantageously, the centralized vRAN resource controller 43 may be configured to optimize both the CPU policy and the vRAPs' radio scheduling policies jointly. To accomplish this task, the centralized vRAN resource controller 43, which may be provided with radio quality patterns feedback and CPU load pattern feedback, may use learnt mappings of contexts (such as, e.g., SNR patterns, bit-rate load patterns or the like) to actions (CPU policy, radio policies) to a given quality of service (QoS) criterion or a combination of QoS criteria. For instance, the vRAN operator may trade-off vRAP cost (CPU usage) with additional delay (with policies that enforce lower MCSs, which in turn require less CPU resources).

Figure 6:
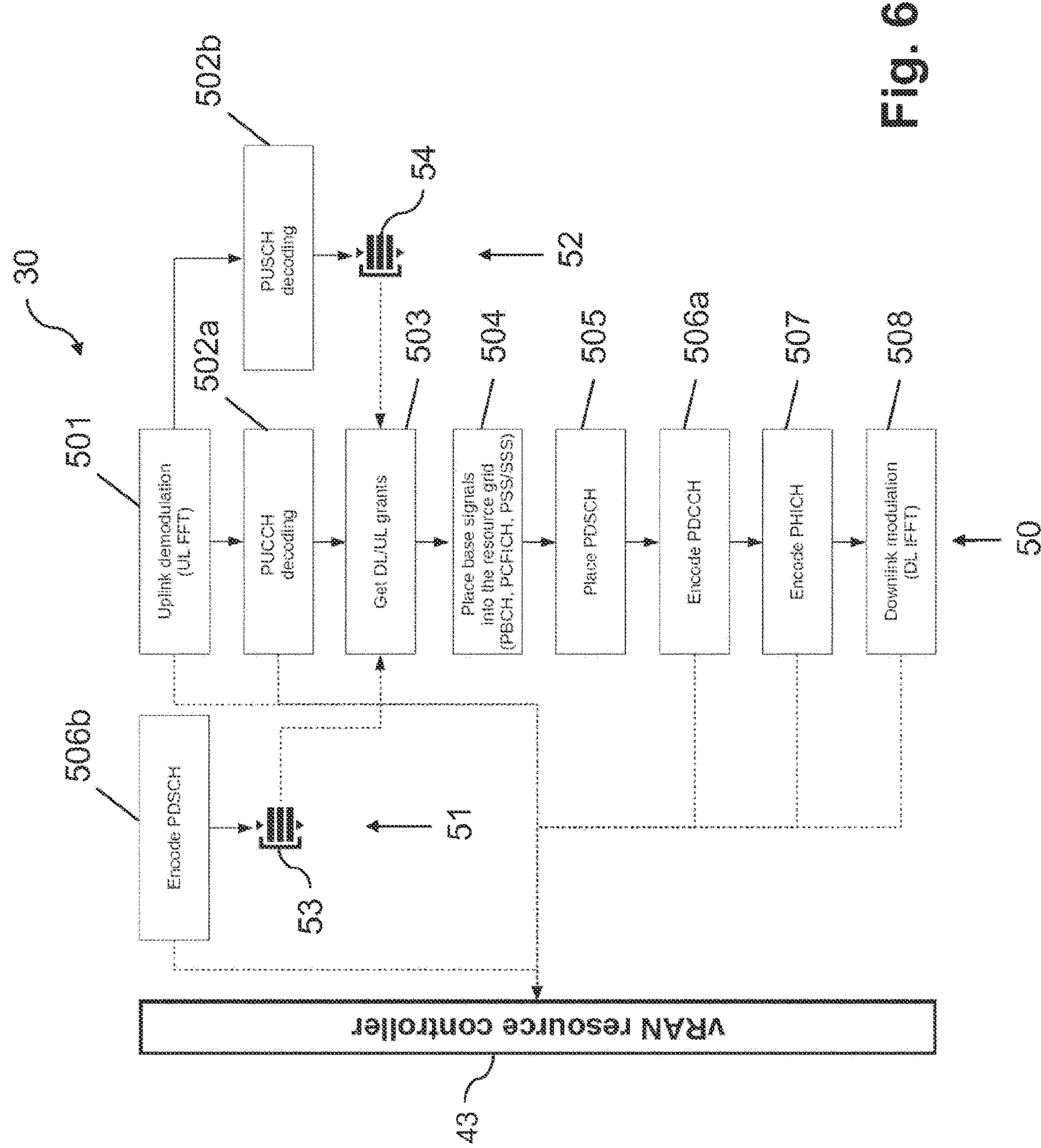
FIG. 6 is a schematic overview of the decoupled L1 processing pipeline of FIG. 5 together with feedback signaling path according to some embodiments.

FIG. 6 illustrates an embodiment of the present invention where the vRAN resource controller 43 is provided with feedback information at one or more subtasks of the L1 pipeline 50 (indicated by the dotted line arrows). This feedback can be used by the vRAN resource controller 43 to construct a model that characterizes the CPU time requirements of the different tasks and use this model to optimize CPU/radio scheduling policies.

Figure 7:
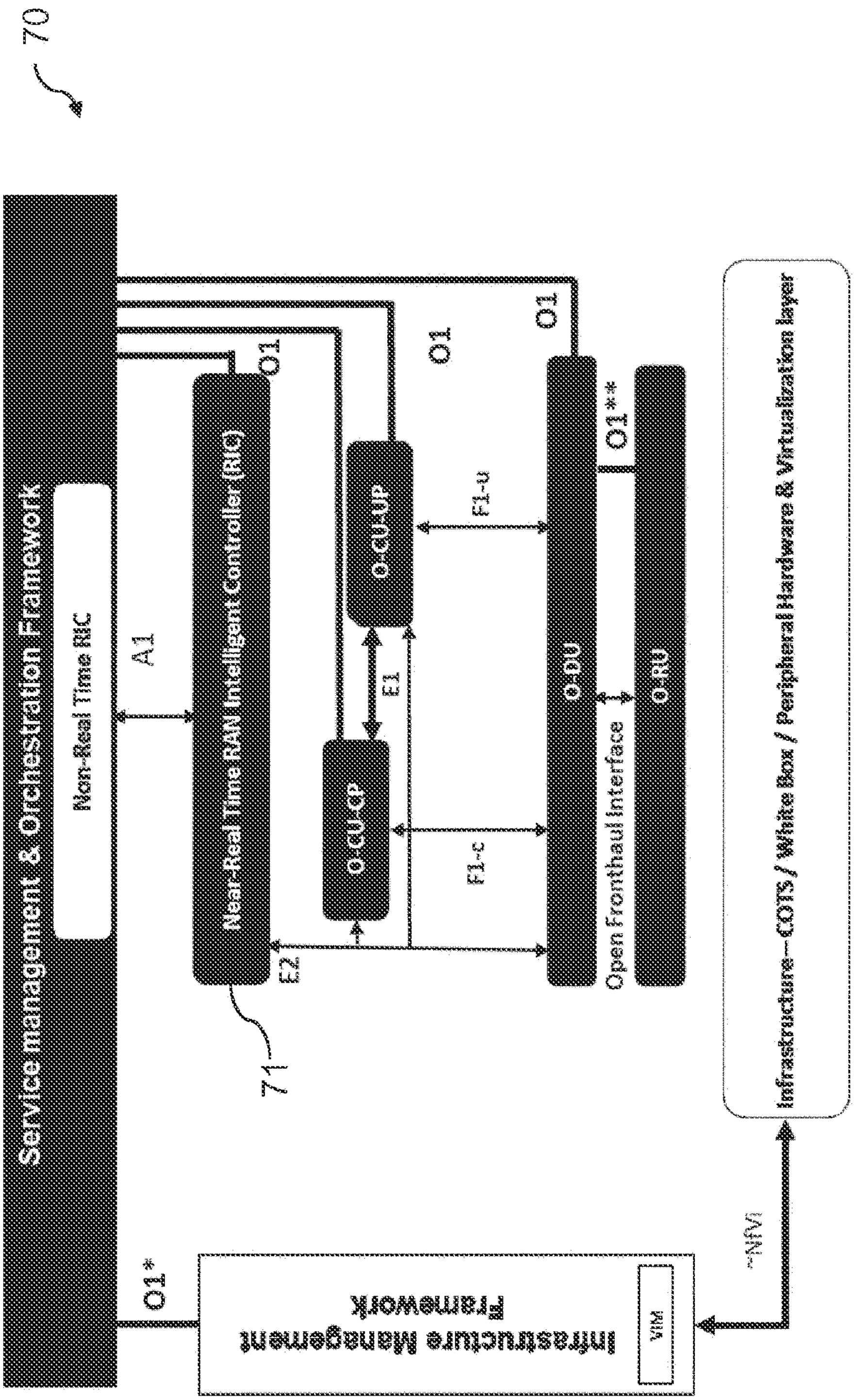
FIG. 7 is a schematic overview illustrating an O-RAN OAM architecture according to some embodiments.

In an embodiment, the present invention provides a vRAN system comprising a vRAN resource controller 43, were the vRAN resource controller 43 is integrated into the near-real-time RAN intelligent controller 71 in O-RAN OAM architecture 70, as depicted in FIG. 7. O-RAN (for reference, see https://www.o-ran.org) is an Alliance founded by operators to evolve radio access networks, making them more open and smarter through real-time analytics, machine learning and virtualization. By integrating the vRAN resource controller 43 of a vRAN system according to embodiments of the present invention into an O-RAN OAM architecture 70, O-RAN's E1 and E2 interfaces can be exploited to control the CU (centralized unit) and DU (distributed unit) radio and computing resources in addition to integrating the centralized CPU scheduler 41.

In an embodiment, the present invention provides a vRAN system that comprises a vRAN resource controller 43 that is configured to use machine learning (ML)/reinforcement learning (RL) algorithms in order to optimize the CPU and the radio scheduling policies. To this end, the vRAN resource controller 43 can use monitoring data from the L1 processing pipeline 50 (e.g., CPU time used per task of each pipeline, UE's SNR patterns, decoding errors) in addition to the MAC procedures as shown in FIG. 4, e.g., DL/UL data load demand of the UEs across all vRAPs. The vRAN resource controller 43 may use this monitoring data to learn optimal context-scheduling action pairs.

According to an embodiment, performance indicator measurements may be performed and the results of these measurements may be provided to the vRAN resource controller 43. The performance indicator measurements may relate to, e.g., pipeline processing latencies, signal quality measurements, vRAPs 11 buffer states, decoding errors, etc. The measured performance indicators may be used to compute a performance metric that may be feed into the vRAN resource controller 43. The performance metric may also be fed to a reinforcement learning model.

Figure 8:
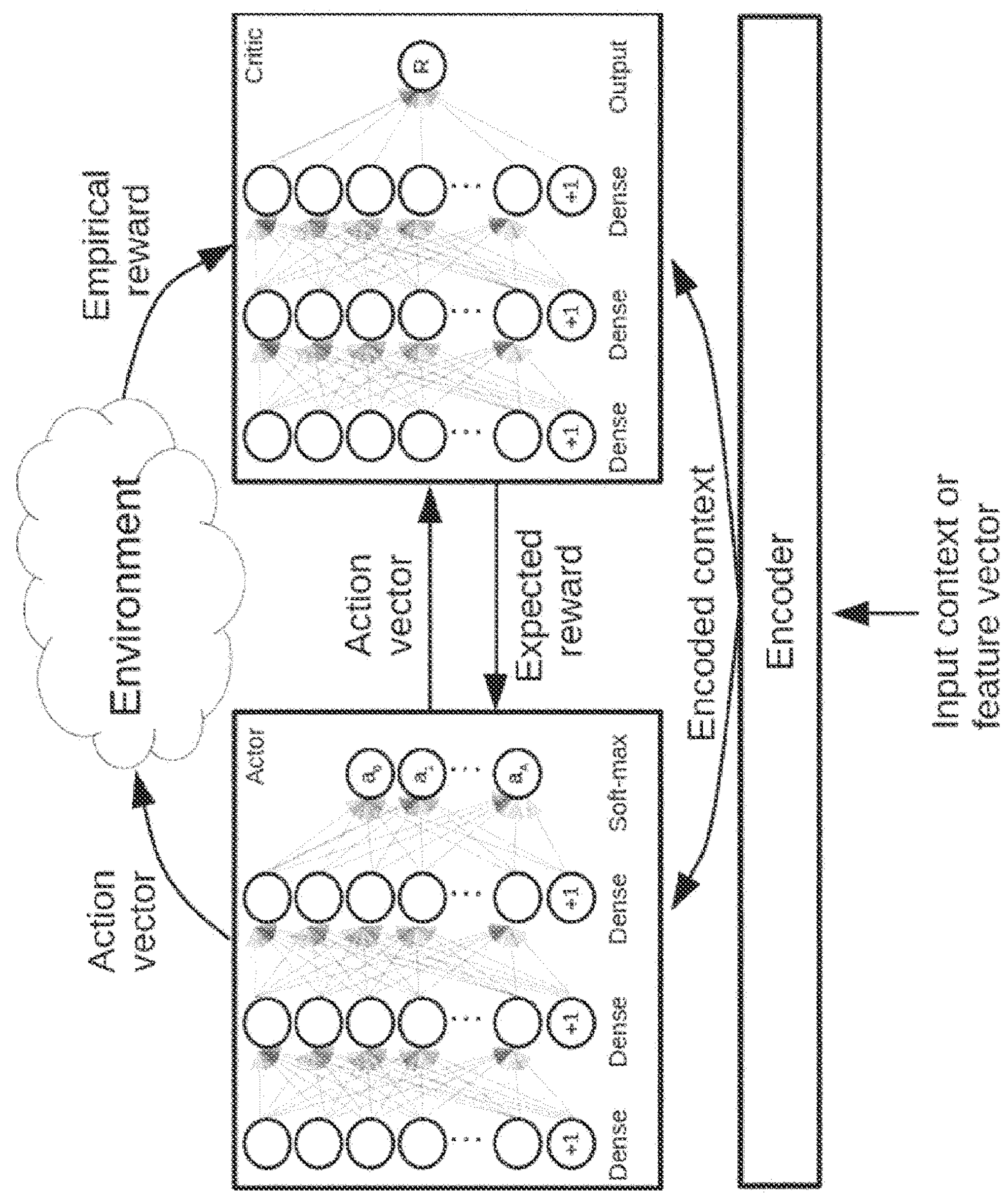
FIG. 8 is a schematic overview of an actor-critic neural network structure implementing a Deep Deterministic Policy Gradient algorithm to be used in a vRAN system according to an embodiment of the invention.

The main challenge is to handle the high-dimensional nature of both context information and action space. To address this, an embodiment uses, for example, an approach based on a Deep Deterministic Policy Gradient algorithm implemented with an actor-critic neural network structure, as shown in FIG. 8. This approach is off-policy and model-free and hence learns optimal policies in an online manner without taking assumptions on the underlying model.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

10 vRAN system
11 vRAP

12 CPU
12*a* dedicated CPU
12*b* shared CPU
13 vRAP stack
14 computing infrastructure
15 CPU scheduler
20 L1 layer
30 L1 pipeline
40 vRAN system
41 centralized CPU scheduler
42*a* real-time DSP worker
42*b* best-effort DSP worker
43 vRAN resource controller
50 main processing pipeline
51, 52 subordinate processing pipeline
53, 54 buffer
70 O-RAN OAM architecture
71 near-real-time RAN intelligent controller

The invention claimed is:

1. A method for managing radio and computing resources of a virtualized radio access network (vRAN), wherein the vRAN comprises a number of virtualized radio access points (vRAPs) sharing a common pool of central processing units (CPUs), wherein a Layer 1 (L1) layer processing pipeline is divided per vRAP into at least one main processing pipeline and into a number of subordinate processing pipelines, the method comprising:

coordinating the execution of the pipelines across multiple vRAPs, the coordinating including:

allocating tasks of the at least one main processing pipeline to dedicated CPUs of the common pool of CPUs, allocating tasks of the subordinate processing pipelines to shared CPUs of the common pool of CPUs, wherein the tasks are allocated such that the at least one main processing pipeline is executed in parallel with the subordinate processing pipelines;

computing CPU scheduling policies and/or radio scheduling policies to be followed by radio schedulers of radio access points (RAPs) and a centralized CPU scheduler of the vRAN;

receiving feedback information from one or more of the tasks of the L1 layer processing pipeline; and optimizing the CPU scheduling policies and the radio scheduling policies to be followed by the radio schedulers of the RAPs and by the centralized CPU scheduler based at least in part on the feedback information.

2. The method according to claim 1, wherein the tasks of the at least one main processing pipeline are processed as real-time or quasi real-time tasks, and wherein the tasks of the subordinate processing pipelines are processed as best-effort tasks.

3. The method according to claim 1, wherein the at least one main processing pipeline is configured to include control channel related operations, including at least control channel encoding and decoding operations, and basic baseband operations, including at least demodulation and modulation operations.

4. The method according to claim 1, wherein the subordinate processing pipelines are configured to include operation of decoding of user data from Physical Uplink Shared Channel (PUSCH) channels and/or operation of encoding of user data into Physical Downlink Shared Channel (PDSCH) channels.

5. The method according to claim 4, further comprising:

buffering the decoded user data from PUSCH channels into a buffer to dispose the decoded user data for processing in upper layers of vRAP stacks.

6. The method according to claim 4, further comprising:

after encoding the user data into the PDSCH channels, buffering the encoded data in a buffer until being placed into a subframe by a place PUSCH task of the at least one main processing pipeline.

7. The method according to claim 1, further comprising:

by the centralized CPU scheduler, jointly scheduling tasks of the L1 layer processing pipelines into the CPUs and data into radio resources in real time or quasi real time.

8. The method according to claim 1, further comprising:

executing performance indicator measurements including at least one of pipeline processing latencies, signal quality measurements, vRAP's buffer states and decoding errors, and providing the results of the measurement to the vRAN resource controller.

9. The method according to claim 1, wherein the subordinate processing pipelines are executed in parallel with each other.

10. A virtualized radio access network (vRAN) system with radio and computing resources management functionality, comprising:

a number of virtualized radio access points (vRAPs) sharing a common pool of central processing units (CPUs), a Layer 1 (L1) layer processing pipeline that is divided, per vRAP, into at least one main processing pipeline and into a number of subordinate processing pipelines, one or more processors executing a centralized CPU scheduler for L1 workload across multiple vRAPs, the centralized CPU scheduler being configured to:

allocate tasks of the at least one main processing pipeline to dedicated CPUs of the common pool of CPUs, and allocate tasks of the subordinate processing pipelines to shared CPUs of the common pool of CPUs, wherein the tasks are allocated such that the at least one main processing pipeline is executed in parallel with the subordinate processing pipelines; and a vRAN resource controller that is configured to:

compute CPU scheduling policies and/or radio scheduling policies to be followed by radio schedulers of radio access points (RAPs) and by the centralized CPU scheduler;

receive feedback information from one or more of the tasks of the L1 layer processing pipeline; and optimize the CPU scheduling policies and the radio scheduling policies to be followed by the radio schedulers of the RAPs and by the centralized CPU scheduler based at least in part on the feedback information.

11. The system according to claim 10, wherein the dedicated CPUs are configured to process the tasks of the at least one main processing pipeline as real-time or quasi real-time tasks, and wherein the shared CPUs are configured to process the tasks of the subordinate processing pipelines as best-effort tasks.

12. The system according to claim 10, wherein the vRAN resource controller is configured to use machine learning and/or reinforcement learning algorithms for optimizing the CPU scheduling policies and/or radio scheduling policies.

13. The system according to claim 10, wherein the vRAN resource controller is integrated into a near-real time RAN Intelligent Controller (RIC) of an Open Radio Access Network (O-RAN) Operation and Maintenance (OAM) architecture.

* * * * *